US008538039B2

(12) United States Patent
Pfaffinger

(10) Patent No.: US 8,538,039 B2
(45) Date of Patent: Sep. 17, 2013

(54) SYSTEM FOR PREDICTING THE BEHAVIOR OF A TRANSDUCER

(75) Inventor: Gerhard Pfaffinger, Regensburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 184 days.

(21) Appl. No.: 12/973,283

(22) Filed: Dec. 20, 2010

(65) Prior Publication Data

US 2011/0087341 A1 Apr. 14, 2011

Related U.S. Application Data

(62) Division of application No. 11/610,688, filed on Dec. 14, 2006, now Pat. No. 8,023,668.

(30) Foreign Application Priority Data

Dec. 14, 2005 (EP) .................................... 05027266

(51) Int. Cl.
*H04B 15/00* (2006.01)

(52) U.S. Cl.
USPC ........................................... 381/94.9; 381/59

(58) Field of Classification Search
USPC .................................................. 381/59, 94.9
See application file for complete search history.

(56) References Cited

U.S. PATENT DOCUMENTS

| | | | | |
|---|---|---|---|---|
| 4,156,801 | A | 5/1979 | Whelan et al. | |
| 4,438,411 | A | 3/1984 | Rubin et al. | |
| 4,709,391 | A | 11/1987 | Kaizer et al. | |
| 5,036,228 | A | 7/1991 | Noro | |
| 5,181,251 | A | 1/1993 | Schultheiss et al. | |
| 5,185,805 | A | 2/1993 | Chiang | |
| 5,418,860 | A | 5/1995 | Daniels | |
| 5,438,625 | A | 8/1995 | Klippel | |
| 5,473,282 | A | 12/1995 | Janssens et al. | |
| 5,577,126 | A * | 11/1996 | Klippel | 381/59 |
| 5,664,000 | A | 9/1997 | Van Woezik et al. | |
| 5,694,476 | A | 12/1997 | Klippel | |
| 5,815,585 | A | 9/1998 | Klippel | |
| 6,058,195 | A * | 5/2000 | Klippel | 381/96 |
| 6,201,873 | B1 | 3/2001 | Dal Farra | |
| 7,826,625 | B2 * | 11/2010 | Lashkari | 381/96 |
| 7,873,172 | B2 * | 1/2011 | Lashkari | 381/59 |

(Continued)

FOREIGN PATENT DOCUMENTS

WO 9725833 7/1997

OTHER PUBLICATIONS

Riberio et al.: "Application of Kalman and RLS Adaptive Algorithms to Non-Linear Loudspeaker Controller Paramater Estimation: a Case Study", Acoustics, Speech and Signal Processing, p. 145-148, Mar. 18, 2005.

(Continued)

*Primary Examiner* — Mohammad Islam
*Assistant Examiner* — Ryan Robinson
(74) *Attorney, Agent, or Firm* — O'Shea Getz P.C.

(57) ABSTRACT

A system for compensating and driving a loudspeaker includes an open loop loudspeaker controller that receives and processes an audio input signal and provides an audio output signal. A dynamic model of the loudspeaker receives the audio output signal, and models the behavior of the loudspeaker and provides predictive loudspeaker behavior data indicative thereof. The open loop loudspeaker controller receives the predictive loudspeaker behavior data and the audio input signal, and provides the audio output signal as a function of the audio input signal and the predictive loudspeaker behavior data.

9 Claims, 13 Drawing Sheets

(56) References Cited

U.S. PATENT DOCUMENTS

| | | | | |
|---|---|---|---|---|
| 2002/0071568 | A1 | 6/2002 | Shuttleworth | |
| 2002/0118841 | A1 * | 8/2002 | Button et al. | 381/55 |
| 2005/0031140 | A1 | 2/2005 | Browning | |
| 2008/0175397 | A1 * | 7/2008 | Holman | 381/55 |

OTHER PUBLICATIONS

Hsu et al.: "Temperature Prediction of the Voice Coil of a Moving Coil Loudspeaker by Computer Simulation", Journal of the Acoustical Society of Japan, vol. 21, No. 2, p. 57-62.

* cited by examiner

SYSTEM FOR PREDICTING THE BEHAVIOR OF A TRANSDUCER

1. CLAIM OF PRIORITY

This patent application is a divisional of U.S. application Ser. No. 11/610,688 filed Dec. 14, 2006 now U.S. Pat. No. 8,023,668.

2. FIELD OF THE INVENTION

This invention relates to a system for predicting the behavior of a transducer using a transducer model, and then using that information to perform appropriate compensation of the signal supplied to the transducer to reduce linear and/or non-linear distortions and/or power compression, thus providing a desired frequency response across a desired bandwidth as well as protection for electrical and mechanical overloads.

3. RELATED ART

An electromagnetic transducer (e.g., a loudspeaker) uses magnets to produce magnetic flux in an air gap. These magnets are typically permanent magnets, used in a magnetic circuit of ferromagnetic material to direct most of the flux produced by the permanent magnet through the magnetic components of the transducer and into the air gap. A voice coil is placed in the air gap with its conductors wound cylindrically in a perpendicular orientation relative to the magnet generating the magnetic flux in the air gap. An appropriate voltage source (e.g., an audio amplifier) is electrically connected to the voice coil to provide an electrical signal that corresponds to a particular sound. The interaction between the electrical signal passing through the voice coil and the magnetic field produced by the permanent magnet causes the voice coil to oscillate in accordance with the electrical signal and, in turn, drives a diaphragm attached to the voice coil to produce sound.

However, the sounds produced by such transducers comprise, in particular, nonlinear distortions. By modeling the nonlinear characteristics of the transducer, the nonlinear transfer function can be calculated. Using these characteristics, a filter with an inverse transfer function can be designed that compensates for the nonlinear behavior of the transducer.

One way of modeling the nonlinear transfer behavior of a transducer is based on the functional series expansion (e.g., Volterra-series expansion). This is a powerful technique to describe the second- and third-order distortions of nearly linear systems at very low input signals. However, if the system nonlinearities cannot be described by the second- and third-order terms of the series, the transducer will deviate from the model resulting in poor distortion reduction. Moreover, to use a Volterra-series the input signal must be sufficiently small to ensure the convergence of the series according to the criterion of Weierstrass. If the Volterra-series expansion of any causal, time invariant, nonlinear system is known, the corresponding compensation system can be derived.

Known systems implementing the Volterra-series comprise a structure having a plurality of parallel branches according to the series properties of the functional series expansion (e.g. Volterra-series expansions). However, at higher levels the transducer deviates from the ideal second- and third-order model resulting in increased distortion of the sound signal. In theory, a Volterra series can compensate perfectly for the transducer distortion. However, perfect compensation requires an infinite number of terms and thus an infinite number of parallel circuit branches. Adding some higher order compensation elements can increase the system's dynamic range. However, because of the complexity of elements required for circuits representing orders higher than third, realization of a practical solution is highly complex.

To overcome these problems, U.S. Pat. No. 5,438,625 to Klippel discloses three ways to implement a distortion reduction network. The first technique uses at least two subsystems containing distortion reduction networks for particular parameters placed in series. These subsystems contain distortion reduction circuits for the various parameters of the transducer and are connected in either a feedforward or feedback arrangement. The second implementation of the network consists of one or more subsystems having distortion reduction circuits for particular parameters wherein the subsystems are arranged in a feedforward structure. If more than one subsystem is used, the subsystems are arranged in series. A third implementation of the network consists of a single subsystem containing distortion reduction sub-circuits for particular parameters connected in a feedback arrangement. The systems disclosed by Klippel provide good compensation for non-linear distortions but still require complex circuitry.

Another problem associated with electromagnetic transducers is the generation and dissipation of heat. As current passes through the voice coil, the resistance of the conductive material of the voice coil generates heat in the voice coil. The tolerance of the transducer to heat is generally determined by the melting points of its various components and the heat capacity of the adhesive used to construct the voice coil. Thus, the power handling capacity of a transducer is limited by its ability to tolerate heat. If more power is delivered to the transducer than it can handle, the transducer can burn up.

Another problem associated with heat generation is a temperature-induced increase in resistance, commonly referred to as power compression. As the temperature of the voice coil increases, the DC resistance of copper or aluminum conductors or wires used in the voice coil also increases. That is, as the voice coil gets hotter, the resistance of the voice coils change. In other words, the resistance of the voice coil is not constant, but rather increases as the temperature goes up. This means that the voice coil draws less current or power as temperature goes up. Consequently, the power delivered to the loudspeaker may be less than what it should be depending on the temperature. A common approach in the design of high power loudspeakers involves simply making the driver structure large enough to dissipate the heat generated. However, designing a high power speaker in this way results in very large and heavy speaker.

U.S. Patent Application 20020118841 (Button et al.) discloses a compensation system capable of compensating for power loss due to the power compression effects of the voice coil as the temperature of the voice coil increases. To compensate for the power compression effect, the system predicts/estimates the temperature of the voice coil using a thermal-model, and adjusts the estimated temperature according to the cooling effect as the voice coil moves back and forth in the air gap. The thermal-model may be an equivalent electrical circuit that models the thermal circuit of a loudspeaker. With the input signal equating to the voltage delivered to the loudspeaker, the thermal-model estimates a temperature of the voice coil. The estimated temperature is then used to modify equalization parameters. To account for the cooling effect of the moving voice coil, the thermal resistance values may be modified dynamically, but since this cooling effect changes with frequency, a cooling equalization filter may be used to spectrally shape the cooling signal, whose RMS level may be used to modify the thermal resistance values. The system may include a thermal limiter that determines whether the estimated voice coil temperature is below a predetermined maximum temperature to prevent overheating and possible destruction of the voice coil. The systems disclosed by Button et al. are based on a linear loudspeaker model and provide compensation for power compression effects and but require relatively complex circuitry and show a strong dependency on the voice coil deviations.

SUMMARY OF THE INVENTION

It is an object of the present invention to predict at least the mechanical, electrical, acoustical and/or thermal behavior of a transducer. It is a further object of the invention to reduce nonlinear distortions with less complex circuitry. It is a further object to overcome the detrimental effect of heat and power compression with transducers.

A performance prediction method for the voice coil is provided using a computerized model based on differential equations over time (t) wherein the continuous time (t) is substituted by a discrete time (n). By doing so, the second deviation in the differential equations leads to an upcoming time sample (n+1). Thus, solving the equations in view of this upcoming time sample the upcoming values of certain transducer variables (e.g., membrane displacement, voice coil current, voice coil temperature, membrane velocity, membrane acceleration, magnet temperature, power at DC resistance of the voice coil, voice coil force etc.) can be predicted.

The model is used to perform appropriate compensation of a voltage signal supplied to the transducer in order to reduce non-linear distortions and power compression and provide a desired frequency response across a desired bandwidth at different drive levels. That is, the system compensates for adverse effects on the compression and frequency response of an audio signal in a loudspeaker due to voice coil temperature rising and nonlinear effects of the transducer. To accomplish this, a signal that is proportional to the voltage being fed to the loudspeaker may be used to predict at least the mechanical, electrical, acoustical and/or thermal behavior of the voice coil of the transducer, using a computerized model based on a differential equation system for the transducer.

A differential equation system describes the motion of the voice coil dependent on the input voltage and certain parameters, where the certain parameters are dependant on the transducer. Mechanical, electrical, acoustical, and/or thermal behavior of the transducer are calculated by solving the differential equation system for an upcoming discrete time sample.

The system for compensating for unwanted behavior of a transducer comprises a transducer modeling unit for calculating the mechanical, electrical, acoustical, and/or thermal behavior of the transducer by solving a differential equation system in the discrete time domain for an upcoming discrete time sample. The differential equation system describes the motion of the voice coil dependent on the input voltage and certain parameters and the certain parameters are dependant on the transducer. A signal processing unit receives status signals from the modeling unit to compensate for a difference between a behavior calculated by the modeling unit and a predetermined behavior.

DESCRIPTION OF THE DRAWINGS

The present invention can be better understood with reference to the following drawings and description. The components in the drawings are not necessarily to scale, emphasis instead being placed upon illustrating the principles of the invention. Moreover, in the figures, like reference numerals designate corresponding parts throughout the different views. In the drawings.

DETAILED DESCRIPTION

Figure 1:
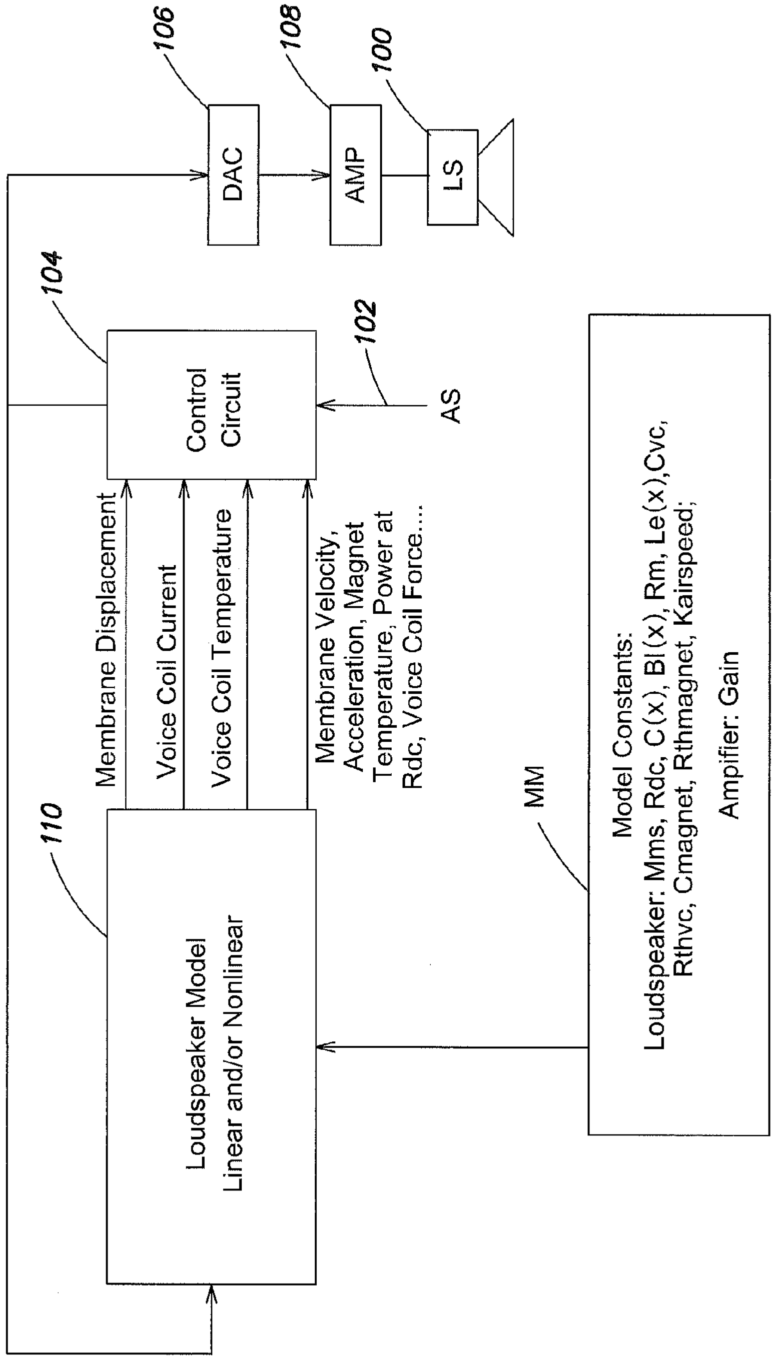
FIG. 1 is block diagram of a system for compensating for unwanted behavior of a transducer.

The present invention is further described in detail with references to the figures illustrating examples of the present invention. FIG. 1 shows a system for compensating for power loss and distortions (linear and non-linear) of a transducer such as a loudspeaker 100 having a magnet system with an air gap (not shown), and a voice coil movably arranged in the air gap (not shown) and supplied with an electrical input voltage. For the following considerations, for example, in terms of mass and cooling due to air flow et cetera, the diaphragm is considered part of the voice coil. A digital audio signal is supplied on a line 102 to the loudspeaker 100 via a control circuit 104, a digital-to-analog converter 106, and an analog amplifier 108. Instead of a combination of the digital-to-analog converter 106 and the analog amplifier 108, a digital amplifier providing an analog signal to the loudspeaker 100 may be used. In this embodiment, there is no feedback from the loudspeaker 100 to the control circuit 104 required (i.e., no sensor for evaluating the situation at the loudspeaker 100) thus decreasing the complexity of the system and reducing manufacturing costs.

The control circuit 104 may be adapted to compensate for distortions and/or power loss by, for example, equalizing unwanted distortions, attenuating high sound levels, providing compensating signals (correction signals) or even disconnecting (e.g., clipping) the audio signal on the line 102 in case certain levels of temperature, power, or distortions may lead to unwanted sound or serious damage of the loudspeaker 100 are reached. The control circuit 104 does not process data provided by the loudspeaker, i.e., from sensors attached thereto. It is an open loop system that uses signals provided by a computerized loudspeaker model that models the behavior of the loudspeaker 100.

A modeling circuit 110 for modeling the loudspeaker behavior provides data such as a plurality of sensors attached to loudspeaker would do. Data provided by the model 110 may include membrane displacement, voice coil current, voice coil temperature, membrane velocity, membrane acceleration, magnet temperature, power at DC resistance of the voice coil, voice coil force etc. To collect such data in a conventional system a plurality of sensors would be required, most of which are difficult to manufacture and to install with the loudspeaker in question. According to an aspect of the invention, the loudspeaker 100 is modified/described by parameters such as, but not limited to the mass Mms of the magnet system, DC resistance $R_{DC}$, thermal capacitance C(x) versus displacement of the voice coil, magnetic flux Bl(x) versus displacement of the voice coil, thermal capacitance $C_{vc}$ of the voice coil, thermal resistance $R_{thvc}$ of the voice coil, thermal capacitance $C_{magnet}$ of the magnet system, thermal resistance $R_{thm}$ of the magnet system, and airspeed K. The parameters depend on the loudspeaker used and may be once measured or calculated and then stored in a memory. Even shown in the drawings as separate units, the control circuit 104 and the modeling circuit 110 may be realized as a single unit, e.g., in a single digital signal processor (DSP) including, as the case may be, also the memory.

The model of the loudspeaker may be based, in particular, on nonlinear equations using typical (once measured) parameters of the loudspeaker. In general, the nonlinear equations for a given loudspeaker are:

$$Ue(t) = \mathrm{Re}\cdot I(t) + I(t)\cdot dLe(x)/dt + Le(x)\cdot dI(t)/dt + \sum_{i=0}^{8} Bl_i\cdot x(t)^i\cdot dx(t)/dt \tag{1}$$

$$\sum_{i=0}^{8} Bl_i\cdot x(t)^i\cdot I(t) = m\cdot d^2x(t)/dt^2 + Rm\cdot dx(t)/dt + \sum_{i=0}^{8} K_i\cdot x(t)^i\cdot x(t) - 1/2\cdot I(t)^2\cdot dLe(x)/dx \tag{2}$$

wherein Ue(t) is the voice coil voltage versus time t, Re is the electrical resistance of the voice coil, I(t) is the voice coil current versus time t, Le(t) is the inductivity of the voice coil versus time t, Bl is the magnetic flux in the air gap, x(t) is the displacement of the voice coil versus time t, m is the total moving mass, and K is the stiffness.

If taking a discrete time n instead of a continuous time t $$\frac{dx}{dt} = (x(n) - x(n-1))/\Delta t = xp(n) \tag{3}$$

$$\frac{d^2x}{dt^2} = (x(n+1) - 2*x(n) + x(n-1))/\Delta t^2$$

and neglecting Le(x), the future loudspeaker displacement x(n+1) is:

$$x(n+1)=(Bl(x)\cdot Ue(n)/Re-(x(n)-x(n-1))/dt\cdot(Rm+Bl(x)\cdot Bl(x)/Re)-K(x)\cdot x(n))\cdot dt\cdot dt/m+2\cdot x(n)-x(n-1) \tag{4}$$

wherein Bl(x) and K(x) are polynomials of 4th to 8th order. Accordingly, the power loss $P_v(n+1)$ at time n+1 in the voice coil is:

$$P_v(n+1)=I(n+1)\cdot I(n+1)\cdot Re(n) \tag{5}$$

Figure 2:
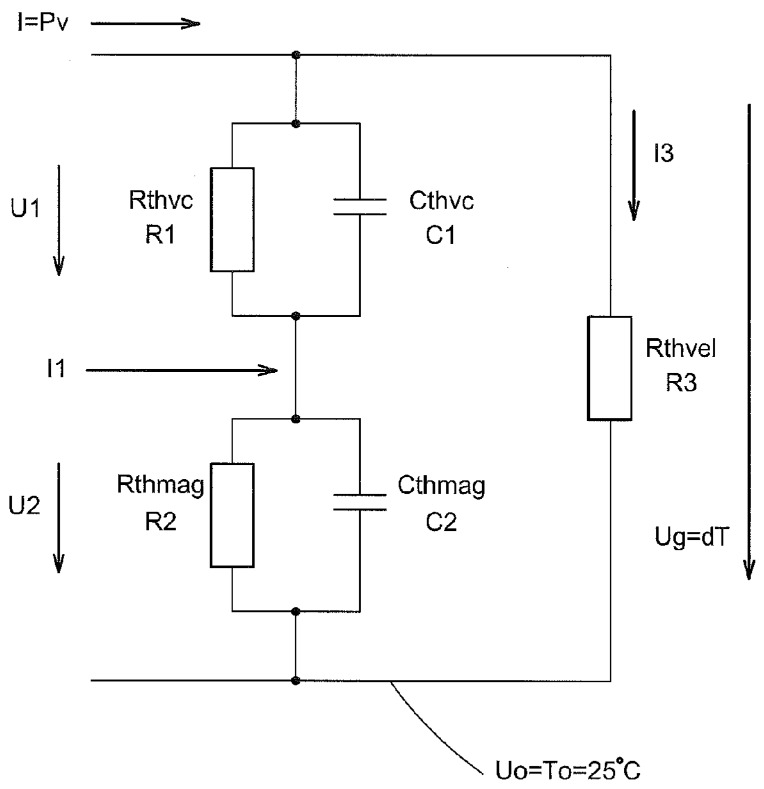
FIG. 2 is an equivalent circuit diagram illustrating the thermal model of the transducer used in FIG. 1.

Referring to FIG. 2, the thermal behavior can be illustrated as a thermal circuit comprising thermal resistors $R_1$, $R_2$, $R_3$ and thermal capacitors $C_1$, $C_2$, wherein $R_1$ represents the thermal resistance $R_{thvc}$ of the voice coil, $R_2$ represents the thermal resistance $T_{thmag}$ of the magnet system, $R_3$ represents the thermal resistance of the air flow around the loudspeaker, $C_1$ represents the thermal capacitance $C_{thvc}$ of the voice coil, $C_2$ is the thermal capacitance $C_{thmag}$ of the magnet system, I is the power loss $P_v$, $U_0$ is the ambient temperature $T_0$, and $U_g$ is the temperature increase dT caused by the loudspeaker. The thermal circuit comprises a first parallel sub-circuit of the resistor R1 and the capacitor C1. The first parallel sub-circuit is connected in series to a second parallel sub-circuit of the resistor R2 and the capacitor C2. The series circuit of the two parallel sub-circuits is connected in parallel to the resistor R3. Accordingly, input current I is divided into a current $I_1$ through the branch formed by the resistors R1, R2 and the capacitors $C_1$, $C_2$, and into a current $I_3$ through resistor $R_3$. One terminal of the circuit is supplied with potential $U_0$ that serves as reference potential while $U_g$ is the temperature increase caused by the loudspeaker. Having the power loss $P_v$ at the voice coil (see equation 3), the voice coil temperature change dT can be calculated as follows:

$$P_v=I=I_1-I_3; \tag{6}$$

$$I_3=(U_1(n+1)+U_2(n+1))/R_3 \tag{7}$$

$$U_g(n+1)=U_1(n+1)+U_2(n+1); \tag{8}$$

$$U_1(n+1)=I\cdot R_1/(1+R_1\cdot C_1/dt)+R_1\cdot C_1/(1+R_1\cdot C_1/dt)\cdot U_1(n)/dt \tag{9}$$

$$U_2(n+1)=I\cdot R_2/(1+R_2\cdot C_2/dt)+R_2\cdot C_2/(1+R_2\cdot C_2/dt)\cdot U_2(n)/dt \tag{10}$$

$$R_3=R_{thvel}=1/(v_{voicecoil}2\cdot K+0.001) \tag{11}$$

$$R_{vc}(T)=R_o\cdot(1+\theta\cdot dT) \tag{12}$$

with θ=0.0377 [1/K] for copper $$R_{vc}=R_o\cdot 3.77 \tag{13}$$

wherein dT=100K and $R_o$=is the resistance at temperature $T_0$

Alternatively or additionally, the loudspeaker's nonlinear behavior can be calculated. Again, starting with the basic equations for a nonlinear speaker model (equations 1 and 2) and taking a discrete time n instead of a continuous time t (equation 3). Further, neglecting Le(x) and only using Le leads to:

$$Ue(n)=\mathrm{Re}*I(n)+Le*(I(n)-I(n-1))/\Delta t+\sum_{i=0}^{8}Bl_i*x(t)^i*xp(n) \tag{14}$$

wherein equation 14 also reads as:

$$I(n)=\left(Ue(n)-\sum_{i=0}^{8}Bl_i\cdot x(t)^i\cdot xp(n)+Le\cdot I(n-1)/\Delta t\right)\Big/(\mathrm{Re}+Le/\Delta t) \tag{15}$$

Accordingly, equation 2 with discrete time n leads to:

$$\sum_{i=0}^{8}Bl_i*x(n)^i*I(n)=m*(x(n+1)-2*x(n)+x(n-1))/\Delta t^2+Rm*xp(n)+\sum_{i=0}^{8}K_i*x(n)^i*x(n) \tag{16}$$

The predicted future displacement x(n+1) versus discrete time n is:

$$x(n+1)=\left(\sum_{i=0}^{8}Bl_i*x(n)^i*I(n)-Rm*xp(n)-\sum_{i=0}^{8}K_i*x(n)^i*x(n)\right)*\Delta t^2/m+2*x(n)-x(n-1) \tag{17}$$

which is the amplitude of a loudspeaker at a time n. Thus the following calculations can be made:

a) Calculation of the current into the speaker using equation 15.

b) Calculation of the amplitude using equation 17.

c) Calculation of the velocity at xp(n).

d) Calculation of the acceleration with $$xxp=(xp(n)-xp(n-1))/\Delta t \tag{18}$$

e) Calculation of the power into the loudspeaker which is $$P(n)=I(n)^2*Re \tag{19}$$

For controlling the loudspeaker to obtain a linear system, the equations for a linear system are used, which are:

$$I(n)=(Ue(n)-Bl_{lin}*xp(n)+Le*I(n-1)/\Delta t)/(Re+Le/\Delta t) \tag{20}$$

$$x(n+1)=(Bl_{lin}*I(n)-Rm*xp(n)-K_{1in}*x(n))*\Delta t^2/m+2*x(n)-x(n-1) \tag{21}$$

In case, a nonlinear system is controlled to be a linear system:

$$x(n+1)_{linear}=x(n+1)_{nonlinear} \tag{22}$$

The linearization of a nonlinear system can be made as explained below by a correction factor $U(n)_{correction}$:

$$Ue(n)_{linear}=Ue(n)_{nonlinear}+U(n)_{correction} \tag{23}$$

Implementing the basic nonlinear equations (equations 1 and 2) according to equation 23 leads to:

$$\left(\sum_{i=0}^{8}Bl_i*x(n)^i*I(n)-Rm*xp(n)-\sum_{i=0}^{8}K_i*x(n)^i*x(n)\right)*\Delta t^2/m+2*x(n)-x(n-1)=(Bl_{lin}*I(n)-Rm*xp(n)-K_{lin}*x(n))*\Delta t^2/m+2*x(n)-x(n-1) \tag{24}$$

If $x(n)_{linear}$ and $x(n)_{nonlinear}$ are the same, then x(n−1), xp(n) . . . has to be the same. Thus simplifying equation 24 leads to:

$$\sum_{i=0}^{8}Bl_i*x(n)^i*I_{nonlin}(n)-\sum_{i=0}^{8}K_i*x(n)^i*x(n)=Bl_{lin}*I_{lin}(n)-K_{lin}*x(n) \tag{25}$$

$$I_{nonlin}(n)=\left(Bl_{lin}*I_{lin}(n)-K_{lin}*x(n)+\sum_{i=0}^{8}K_i*x(n)^i*x(n)\right)\Big/\sum_{i=0}^{8}Bl_i*x(n)^i \tag{26}$$

Equation 26 provides the current for nonlinear compensation so that the correction voltage $U_{correction}$ is:

$$U_{correction}(n) = I_{nonlin}(n) * (\text{Re} + Le/\Delta t) - Le/\Delta t * I_{nonlin}(n-1) + \sum_{i=0}^{8} Bl_i * x(t)^i * xp(n) - Ue(n) \quad (27)$$

For compensation, the power at the voice coil has to be evaluated due to the fact that Re is very temperature dependent. The amplifier 108 (having a gain which also has to be considered by the model) supplies a voltage U(n) to the loudspeaker 100, wherein voltage U(n) is:

$$U(n)=Ue(n)+U_{correction}(n) \quad (28)$$

This causes a higher power loss at Re at the voice coil which can be calculated with a linear loudspeaker model since the loudspeaker's frequency response is "smoothened".

Figure 3:
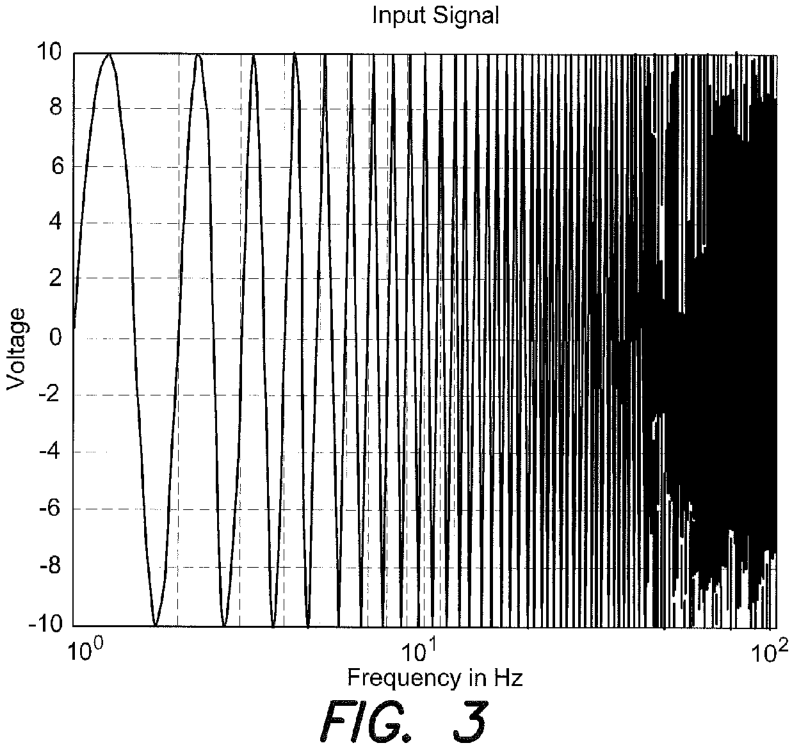
FIG. 3 is a diagram showing the voltage of an audio signal (sine sweep) to be supplied to the transducer used in FIG. 1 versus frequency.
Figure 4:
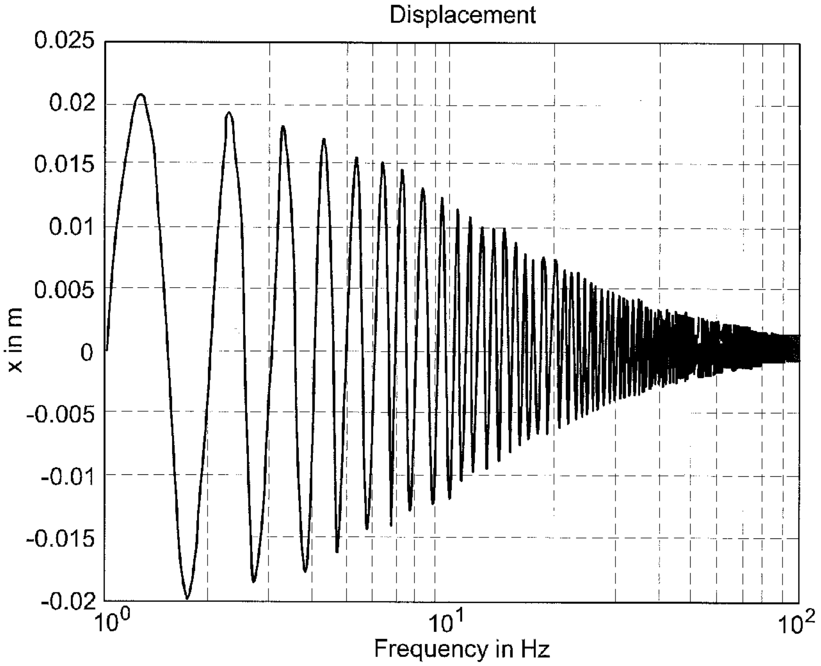
FIG. 4 is a diagram showing the displacement of the voice coil of the transducer used in FIG. 1 versus frequency; the diagram is calculated by the linear model according to an aspect of the present invention.
Figure 5:
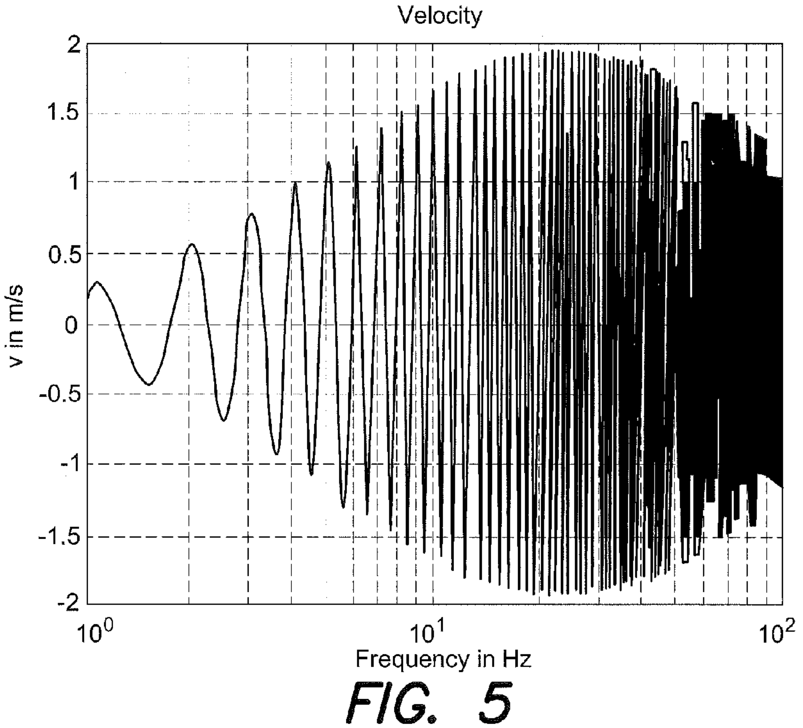
FIG. 5 is a diagram showing the velocity of the voice coil of the transducer used in FIG. 1 versus frequency; the diagram is calculated by the linear model according to an aspect of the present invention.
Figure 6:
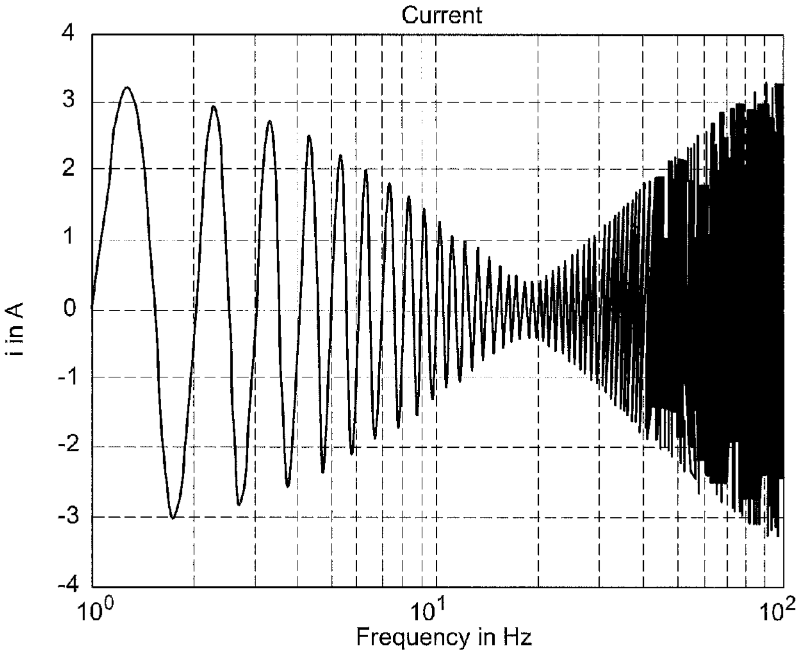
FIG. 6 is a diagram showing the current through the voice coil of the transducer used in FIG. 1 versus frequency; the diagram is calculated by the linear model according to an aspect of the present invention.
Figure 7:
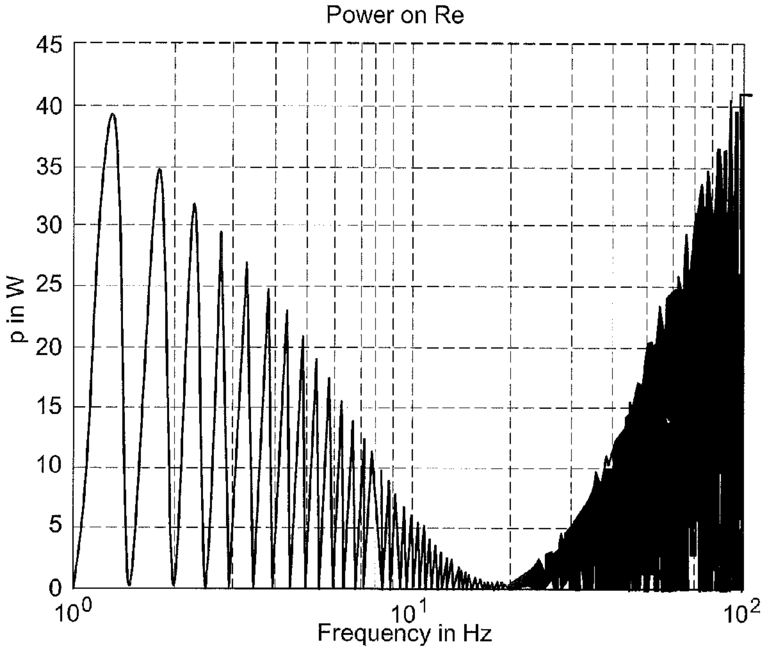
FIG. 7 is a diagram showing the power supplied to the voice coil of the transducer used in FIG. 1 versus frequency; the diagram is calculated by the linear model according to an aspect of the present invention.
Figure 8:
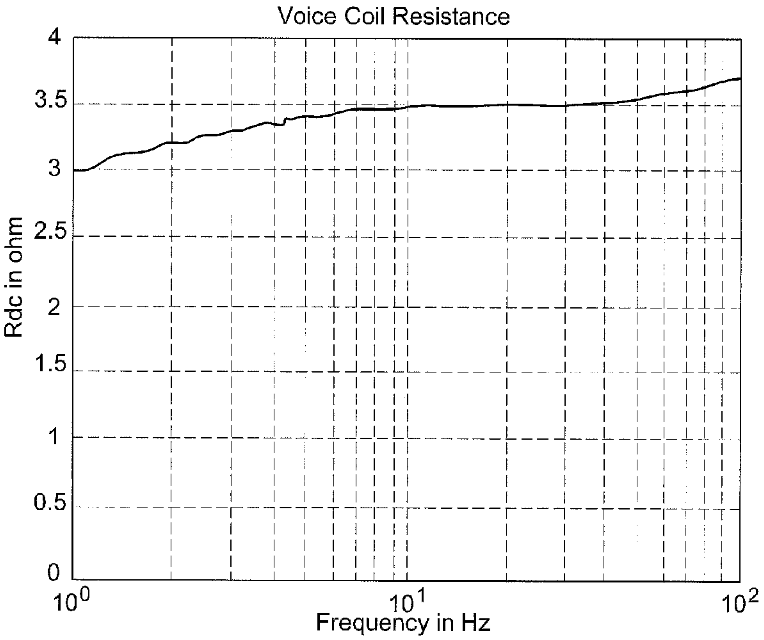
FIG. 8 is a diagram showing the voice coil resistance of the transducer used in FIG. 1 versus frequency; the diagram is calculated by the linear model according to an aspect of the present invention.
Figure 9:
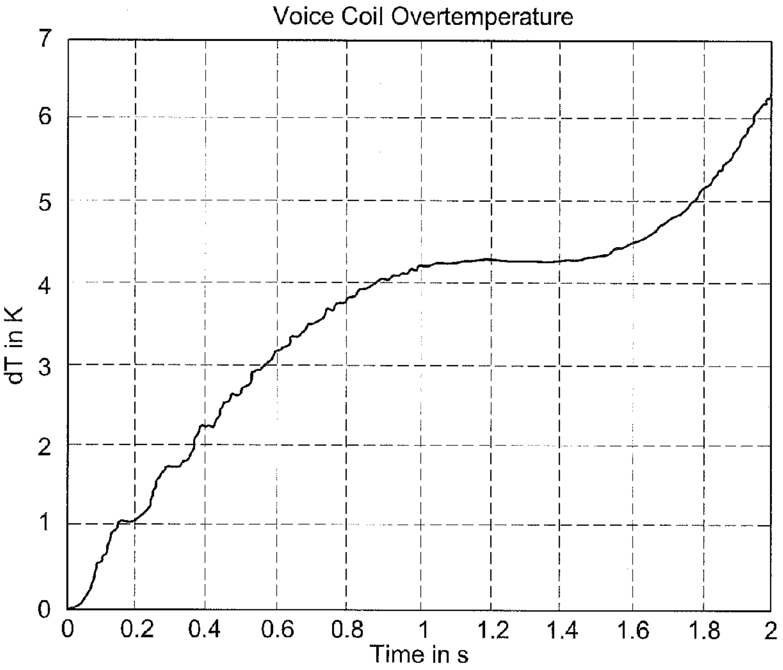
FIG. 9 is a diagram showing the voice coil overtemperature of the transducer used in FIG. 1 versus time; the diagram is calculated by the linear model of FIG. 2.
Figure 10:
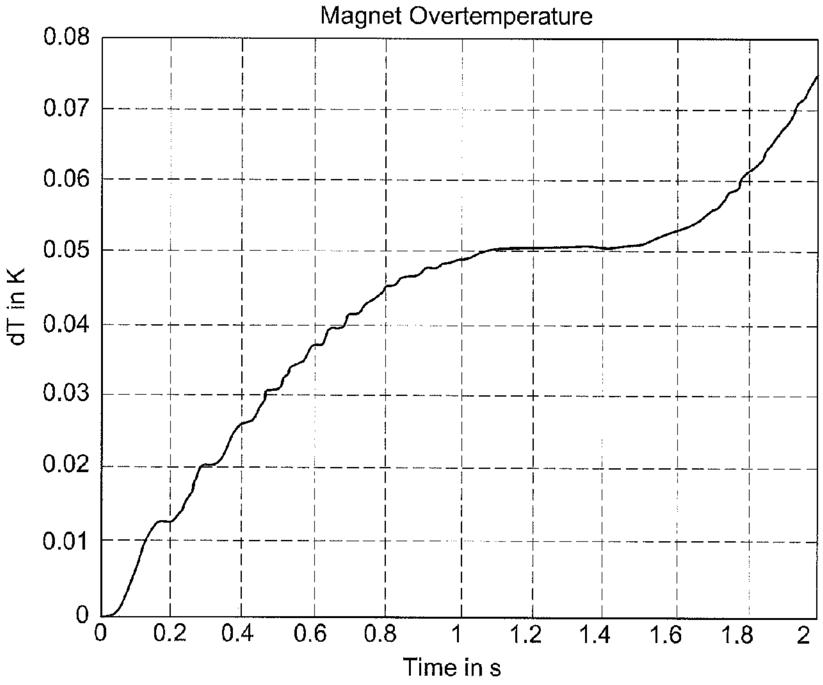
FIG. 10 is a diagram showing the magnet overtemperature of the transducer used in FIG. 1 versus time; the diagram is calculated by the linear model.

Based on the input audio signal shown in FIG. 3 versus frequency, FIGS. 4-10 show diagrams of variables calculated by the above-illustrated linear model such as the displacement of the voice coil of the loudspeaker 100 versus frequency (FIG. 4); the velocity of the voice coil of the loudspeaker versus frequency (FIG. 5); the current through the voice coil versus frequency (FIG. 6); the power supplied to the voice coil versus frequency (FIG. 7); the voice coil resistance versus frequency (FIG. 8); the voice coil overtemperature versus time (FIG. 9); and the magnet overtemperature versus time (FIG. 10).

Figure 14:
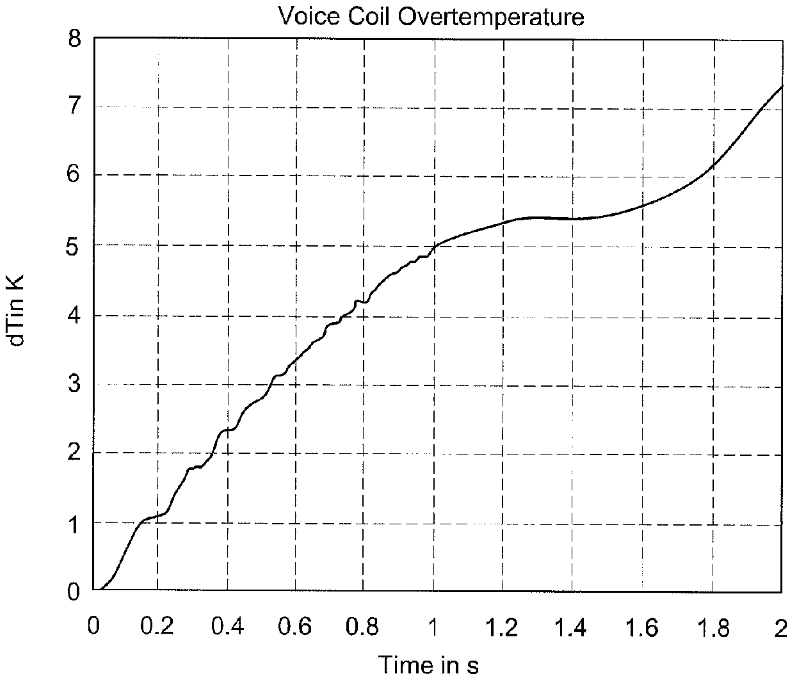
FIG. 14 is a diagram showing the voice coil overtemperature of the transducer used in FIG. 1 versus time; the diagram is calculated by the nonlinear model.

FIGS. 11-14 show diagrams of variables calculated by the above-illustrated nonlinear model such as the magnetic flux in the air gap of the transducer versus displacement, i.e., amplitude (FIG. 11); the stiffness of the voice coil (including diaphragm) versus displacement, i.e., amplitude (FIG. 12); the displacement of the voice coil versus frequency (FIG. 13); and the voice coil over temperature versus time (FIG. 14).

Figure 15:
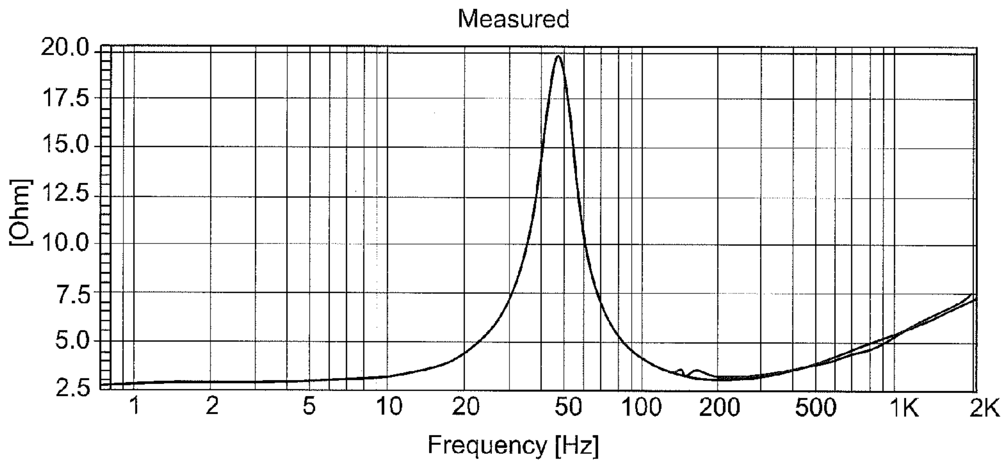
FIG. 15 is a diagram showing the voice coil impedance of the real transducer used in FIG. 1 versus frequency; the diagram is the outcome of measurements.
Figure 16:
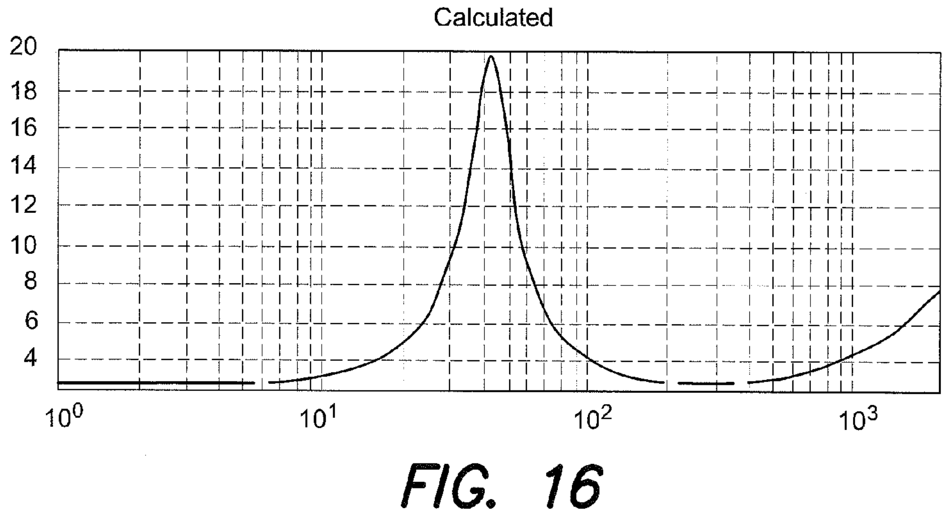
FIG. 16 is a diagram showing the voice coil impedance of the transducer used in FIG. 1 versus frequency; the diagram is calculated by the model according to an aspect of the present invention.
Figure 17:
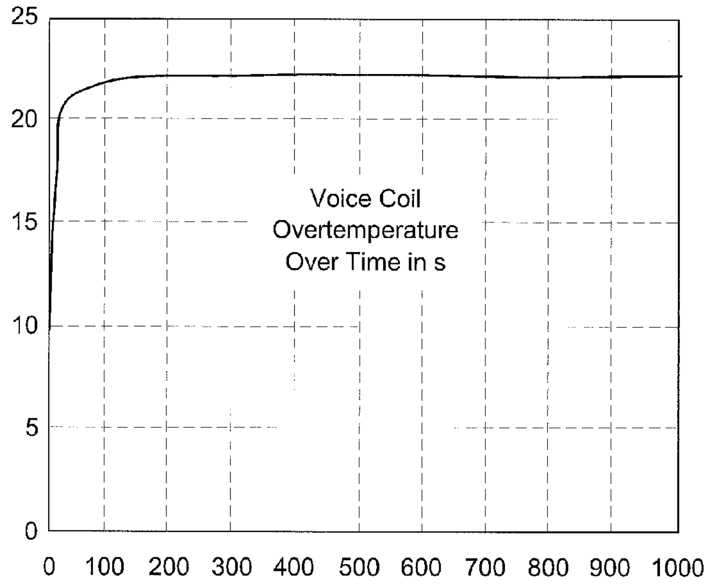
FIG. 17 is a diagram showing the voice coil overtemperature of the transducer used in FIG. 1 versus time (long time); the diagram is calculated by the nonlinear model.
Figure 18:
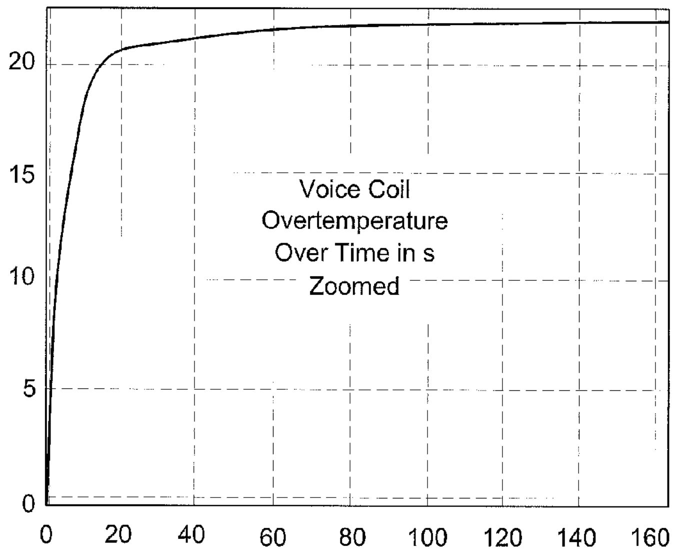
FIG. 18 is the diagram of FIG. 17 showing the voice coil overtemperature versus a zoomed time axis.
Figure 19:
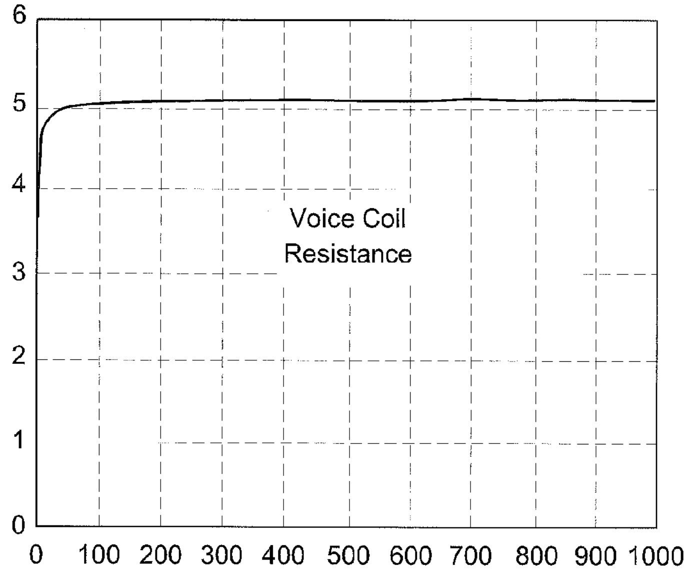
FIG. 19 is a diagram showing the voice coil resistance of the transducer used in FIG. 1 versus time; the diagram is calculated by the nonlinear model.
Figure 20:
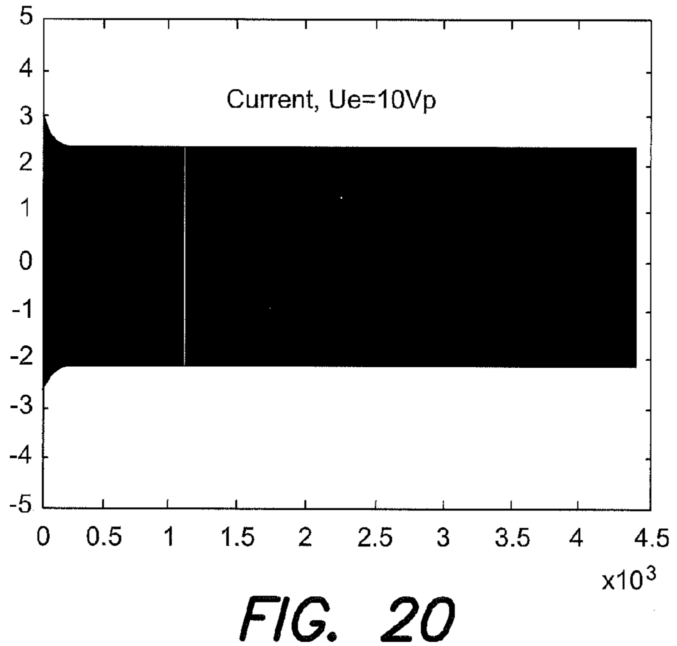
FIG. 20 is a diagram showing the voice coil resistance of the transducer used in FIG. 1 versus time; the diagram is calculated by the nonlinear model according to an aspect of the present invention.

In FIGS. 15 and 16, the measured voice coil impedance of the loudspeaker versus frequency (FIG. 15) is compared with the voice coil impedance calculated by the model according to an aspect of the present invention (FIG. 16). As can be seen readily, both diagrams are almost identical proving the accuracy of the model.

Figure 11:
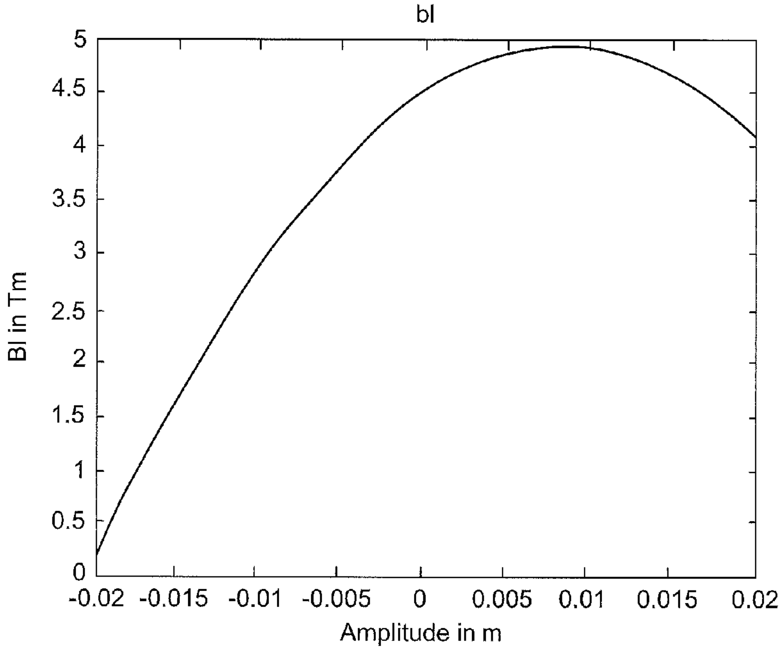
FIG. 11 is a diagram showing the magnetic flux in the air gap of the transducer used in FIG. 1 versus displacement (amplitude); the diagram is calculated by the nonlinear model.
Figure 12:
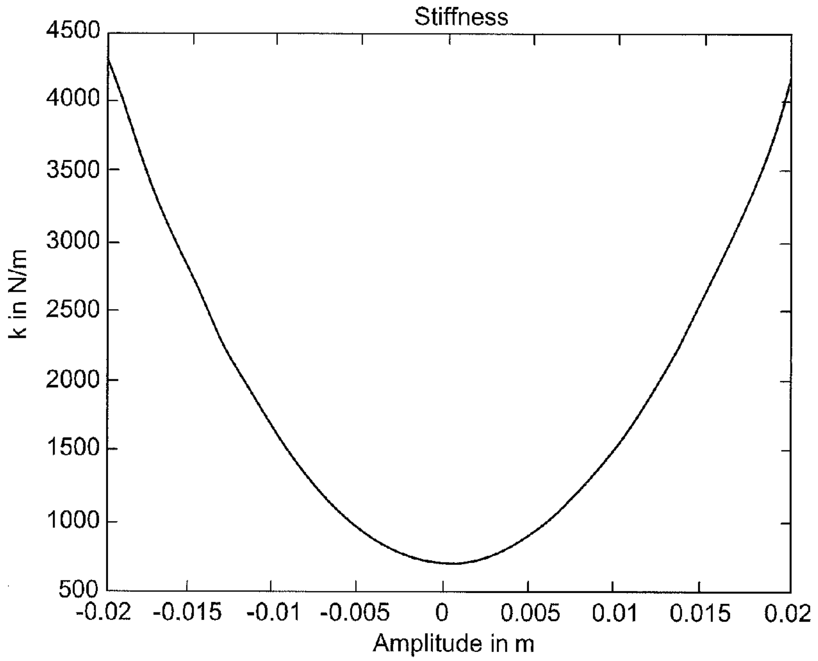
FIG. 12 is a diagram showing the stiffness of the voice coil (including diaphragm) of the transducer used in FIG. 1 versus displacement (amplitude); the diagram is calculated by the nonlinear model.
Figure 13:
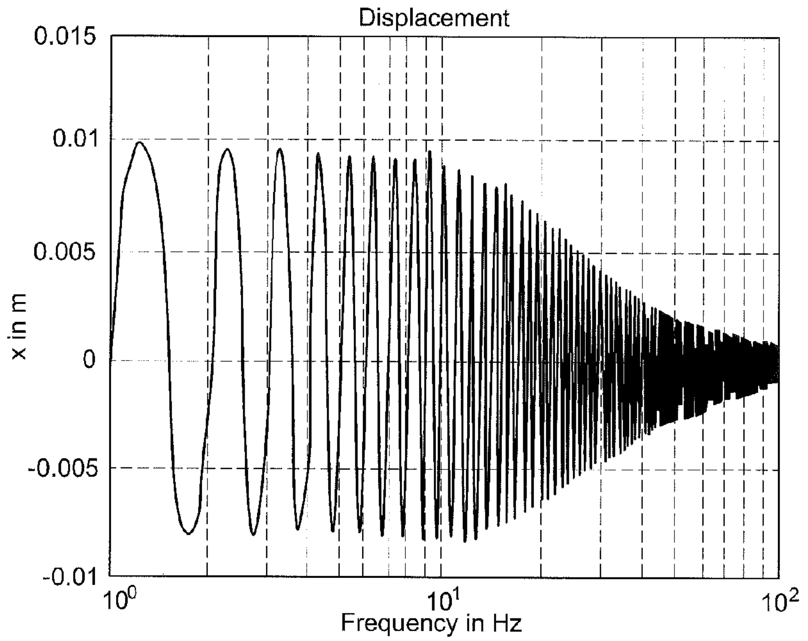
FIG. 13 is a diagram showing the displacement of the voice coil of the transducer used in FIG. 1 versus frequency; the diagram is calculated by the nonlinear model.

FIGS. 17-20 show signals supplied by the modeling circuit 110 to the control circuit 104, such as the voice coil overtemperature of the loudspeaker 100 versus time (FIGS. 17, 18); the voice coil resistance of the transducer versus time (FIG. 19); and the voice coil resistance versus time (FIG. 20), wherein Bl/Kx is different from FIGS. 11 and 12.

Figure 21:
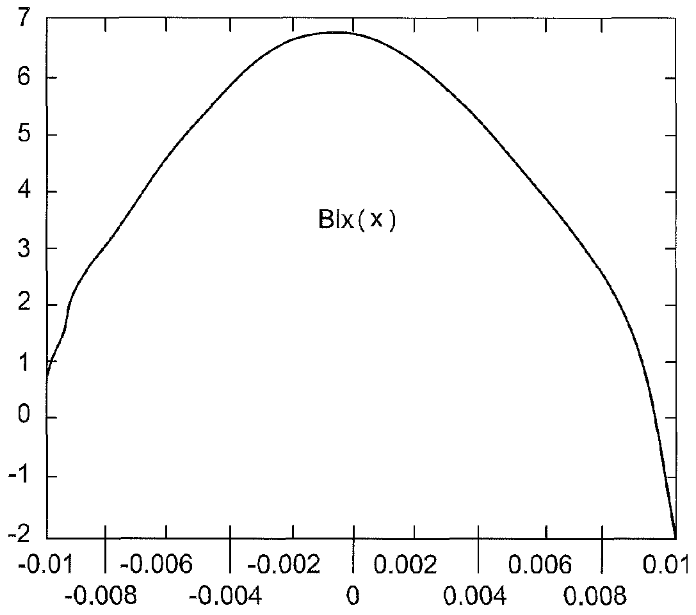
FIG. 21 is a diagram showing the signal course of the magnetic flux of the transducer used in FIG. 1 versus displacement; the signal course forms a parameter of the nonlinear model.
Figure 22:
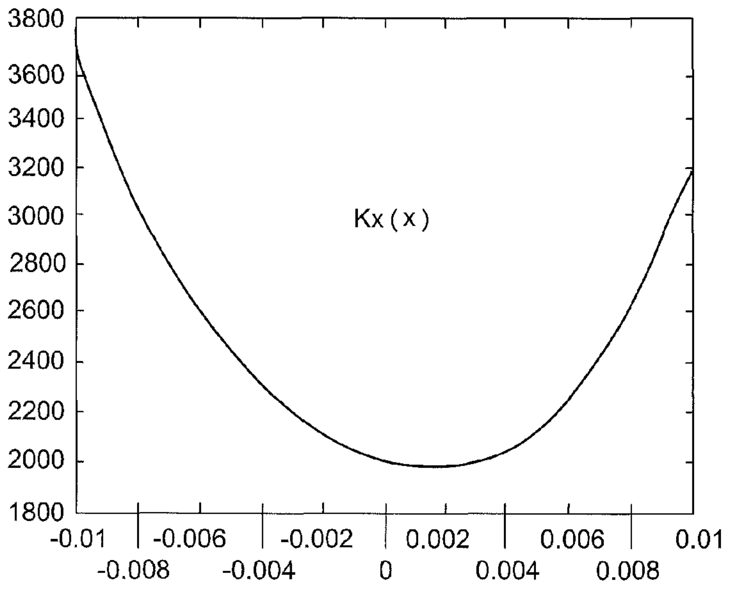
FIG. 22 is a diagram showing the signal course of an airflow cooling factor of the transducer used in FIG. 1 versus displacement; the signal course illustrates a parameter of the nonlinear model according to an aspect of the present invention.

FIG. 21 is a diagram showing the magnetic flux of the loudspeaker 100 versus displacement; and FIG. 22 is a diagram showing the loudspeaker stiffness displacement; the signals are parameters of the nonlinear model according to the present invention.

Figure 23:
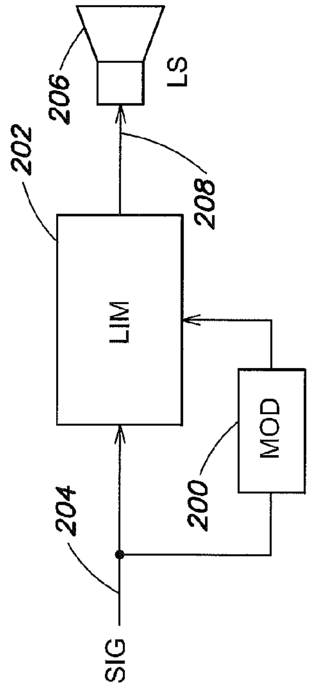
FIG. 23 is a circuit diagram of a system for compensating for unwanted behavior of a loudspeaker by a limiter; the system being supplied with the audio signal.
Figure 24:
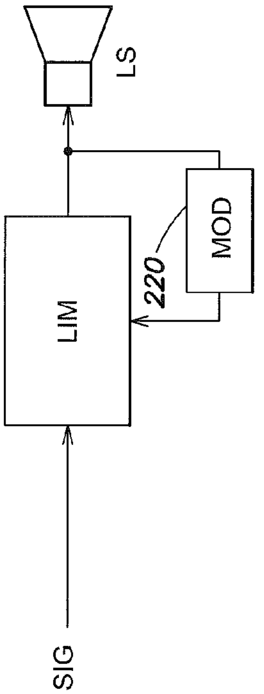
FIG. 24 is a circuit diagram of a system for compensating for unwanted behavior of a loudspeaker by a limiter; the system being supplied with the signal fed into the loudspeaker.
Figure 25:
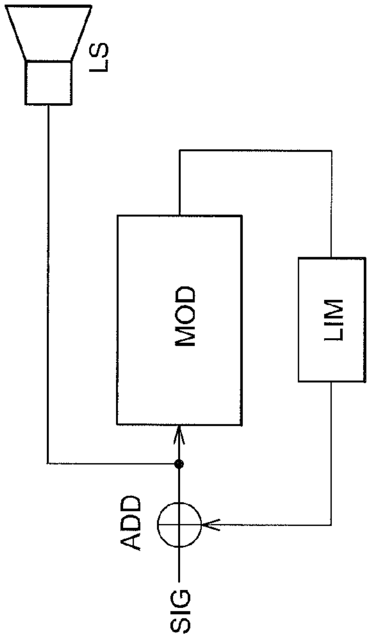
FIG. 25 is a circuit diagram of a system for compensating for unwanted behavior of a loudspeaker by a limiter; the system being supplied with signal output of a modeling circuit.
Figure 26:
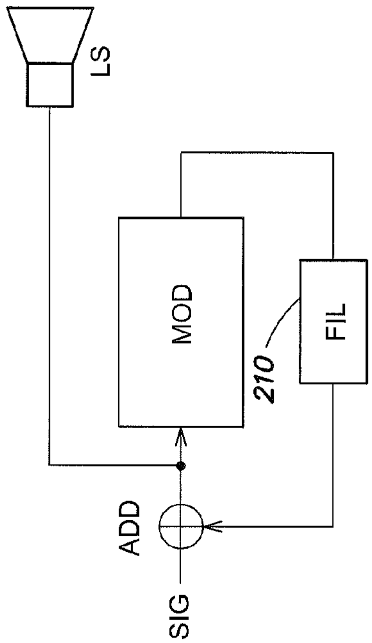
FIG. 26 is a circuit diagram of a system for compensating for unwanted behavior of a loudspeaker by a filter; the system being supplied with signal output of a modeling circuit.

With reference to FIGS. 23-26, a modeling circuit 200 is used in connection with a limiter circuit 202 to limit an audio signal on a line 204 supplied to loudspeaker 206. In FIG. 23, the modeling circuit 200 receives the audio signal on the line 204 and provides certain signals relating to the temperature of the voice coil, displacement of the voice coil, power etc. to the limiter 202. The limiter 202 compares the certain signals with thresholds and, in case the thresholds are reached, limits or cuts off the audio signal on the line 204 to provide a signal on a line 208 to the loudspeaker 206. In FIG. 24, modeling circuit 220 receives the signal supplied to the loudspeaker instead of the audio signal. In FIG. 25, the limiter is not connected upstream of the loudspeaker but is connected downstream the modeling circuit. The signal from the limiter is, in this case, a compensation signal which is added (or subtracted as the case may be) by an adder to generate a signal for the loudspeaker. In FIG. 26 a circuit diagram of a system for compensating for unwanted behavior of a loudspeaker by a filter 210 is described; the system being supplied with signal output of a modeling circuit.

Specific examples of the method and system according to the invention have been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A system for compensating for unwanted behavior of a transducer having a magnet system with an air gap, and a voice coil movably arranged in the air gap and supplied with an electrical input voltage, the system comprising:

a transducer modeling unit for calculating the mechanical, electrical, acoustical, and/or thermal behavior of the transducer by solving a differential equation system in the discrete time domain for an upcoming discrete time sample, where the differential equation system in the discrete time domain describes the motion of the voice coil is dependent on the input voltage and certain parameters dependant on the transducer; and a signal processing unit that receives control signals from the transducer modeling unit and compensates for a difference between a behavior calculated by the modeling unit and a predetermined behavior, where the differential equation system for electrical voltage Ue(t) over time t, the electrical current Ie(t) over time t, and the x(t) is the displacement of the voice coil over time t is:

$$Ue(t) = \text{Re}\cdot I(t) + I(t)\cdot dLe(x)/dt + Le(x)\cdot dI(t)/dt + \sum_{i=0}^{8} Bl_i\cdot x(t)^i\cdot dx(t)/dt \sum_{i=0}^{8} Bl_i\cdot x(t)^i\cdot I(t) = m\cdot d^2x(t)/dt^2 + Rm\cdot dx(t)/dt + \sum_{i=0}^{8} K_i\cdot x(t)^i\cdot x(t) - 1/2\cdot I(t)^2\cdot dLe(x)/dx$$

where the continuous time t is substituted by discrete time n so that t=n; dx/dt=(x(n)−x(n−1))/Δt=xp(n); and $d^2x/dt^2$=(x(n+1)−2*x(n−1))/Δt2; and where the certain parameters comprise Re, Le, Bl, m, Rm, and K.

2. The system of claim 1, where the certain parameters comprise Re as the electrical resistance of the voice coil, Le(t) as the inductivity of the voice coil over time t, Bl as the magnetic flux in the air gap, m as the mass of the voice coil, and K as a factor describing the cooling due to voice coil movement.

3. The system of claim 2, where, as predicted transducer behavior, the predicted displacement x(n+1) of the voice coil at the discrete time n+1 is calculated as $$x(n+1)=(Bl(x)\cdot Ue(n)/Re-(x(n)-x(n-1))/dt\cdot(Rm+Bl(x)\cdot Bl(x)/Re)-K(x)\cdot x(n))\cdot dt\cdot dt/m+2\cdot x(n)-x(n-1).$$

4. The system of claim 2, where, as predicted transducer behavior, the predicted temperature increase dT of the voice coil at the discrete time n+1 is calculated according to:

$$dT(n+1)=I\cdot R_1/(1+R_1\cdot C_1/dt)+R_1\cdot C_1/(1+R_1\cdot C_1/dt)\cdot U_1(n)/dt+I\cdot R_2/(1+R_2\cdot C_2/dt)+R_2\cdot C_2/(1+R_2\cdot C_2/dt)\cdot U_2(n)/dt \text{ where}$$

$$I=Pv=I_1-(U_1(n+1)+U_2(n+1))*(v_{voicecoil}2\cdot K+0.001);$$

where $R_1$ represents the thermal resistance $R_{thve}$ of the voice coil, $R_2$ represents the thermal resistance $T_{thmag}$ of the magnet system, $R_3$ represents the thermal losses of the air flow around the voice coil, $C_1$ represents the thermal capacitance $C_{thve}$ of the voice coil, $C_2$ the thermal capacitance $C_{thmag}$ of the magnet system, I is the power loss $P_v$, $U_0$ is the ambient temperature $T_0$, and $U_g$ is the temperature increase dT of the voice coil.

5. The system of claim 4, where, as predicted transducer behavior, the predicted resistance change $R_{vc}(T)$ of the voice coil due to the temperature change dT at the discrete time n+1 is calculated according to $R_{vc}(T)=R_o\cdot(1+\partial\cdot dT)$; where $R_o$ is the resistance of the voice coil at 25° C., and 9 is a thermal constant depending on the metal of the voice coil wire.

6. The system of claim 2, where, as predicted transducer behavior, the predicted current I(n+1) at the discrete time n+1 into the voice coil is calculated according to:

$$I(n+1)=\left(Ue(n+1)-\sum_{i=0}^{8} Bl_i\cdot x(t)^i\cdot xp(n+1)+Le\cdot I(n)/\Delta t\right)\Big/(\mathrm{Re}+Le/\Delta t).$$

7. The system of claim 6, where, as predicted transducer behavior, the predicted power loss $P_v(n+1)$ in the voice coil at the discrete time n+1 is calculated according to: $P_v(n+1)=I(n+1)^2*\mathrm{Re}$; where Re is the electrical resistance of the voice coil.

8. The system of claim 2, where, as predicted transducer behavior, the predicted displacement x(n+1) of the of the voice coil is calculated according to $$x(n+1)=\left(\sum_{i=0}^{8} Bl_i*x(n)^i*I(n)-Rm*xp(n)-\sum_{i=0}^{8} K_i*x(n)^i*x(n)\right)*\Delta t^2/m+2*x(n)-x(n-1).$$

9. A system for compensating for unwanted behavior of a transducer having a magnet system with an air gap, and a voice coil movably arranged in the air gap and supplied with an electrical input voltage, the system comprising:

a transducer modeling unit for calculating the mechanical, electrical, acoustical, and/or thermal behavior of the transducer by solving a differential equation system in the discrete time domain for an upcoming discrete time sample, where the differential equation system in the discrete time domain describes the motion of the voice coil is dependent on the input voltage and certain parameters dependant on the transducer; and a signal processing unit that receives control signals from the transducer modeling unit and compensates for a difference between a behavior calculated by the modeling unit and a predetermined behavior, where the signal processing unit adds a correction voltage depending on the control signal(s) from the modeling unit to the voltage supplied to the transducer in order to compensate for unwanted behavior, where correction voltage $U_{correction}(n)$ is calculated according to:

$$U_{correction}(n)=I_{nonlin}(n)*(\mathrm{Re}+Le/\Delta t)-Le/\Delta t*I_{nonlin}(n-1)+\sum_{i=0}^{8} Bl_i*x(t)^i*xp(n)-Ue(n)$$

with $$I_{nonlin}(n)=\left(Bl_{lin}*I_{lin}(n)-K_{lin}*x(n)+\sum_{i=0}^{8} K_i*x(n)^i*x(n)\right)\Big/\sum_{i=0}^{8} Bl_i*x(n)^i$$

where xp(n) is the acceleration of the voice coil, $K_{lin}$ the factor of the linearized system and $I_{lin}(n)$ is the linearized current.

* * * * *